United States Patent
Krumhansl et al.

(10) Patent No.: US 8,659,424 B2
(45) Date of Patent: Feb. 25, 2014

(54) SUBSURFACE INTRUSION DETECTION SYSTEM

(75) Inventors: Peter Allen Krumhansl, Amherst, NH (US); William Coney, Littleton, MA (US); Richard Mullen, Needham, MA (US); Jason R. McKenna, Vicksburg, MS (US); Michael Goldsmith, Framingham, MA (US)

(73) Assignees: Raytheon BBN Technologies, Corp., Cambridge, MA (US); US Army Corps of Engineers, Vicksburg, MS (US)

( * ) Notice: Subject to any disclaimer, the term of this patent is extended or adjusted under 35 U.S.C. 154(b) by 374 days.

(21) Appl. No.: 12/702,630

(22) Filed: Feb. 9, 2010

(65) Prior Publication Data

US 2011/0169638 A1 Jul. 14, 2011

Related U.S. Application Data

(60) Provisional application No. 61/151,084, filed on Feb. 9, 2009.

(51) Int. Cl.
*G08B 13/00* (2006.01)
*G08B 21/00* (2006.01)
*G06F 9/44* (2006.01)
*G06F 15/18* (2006.01)

(52) U.S. Cl.
USPC ........... 340/541; 340/566; 340/561; 340/668; 706/52; 706/14

(58) Field of Classification Search
USPC ........................................................ 340/541
See application file for complete search history.

(56) References Cited

U.S. PATENT DOCUMENTS

| | | |
|---|---|---|
| 3,109,165 A | 10/1963 | Bagno |
| 3,261,009 A | 7/1966 | Stetten et al. |
| 3,298,587 A | 1/1967 | Seeloff et al. |
| 3,573,817 A | 4/1971 | Akers |
| 3,585,581 A | 6/1971 | Aune et al. |
| 3,745,552 A | 7/1973 | Wilt |
| 3,803,548 A | 4/1974 | Skujins, Jr. |
| 3,913,085 A | 10/1975 | Farstad |
| 3,961,320 A | 6/1976 | Erdmann et al. |
| 3,967,259 A | 6/1976 | Lecuyer |
| 3,984,803 A | 10/1976 | Hawk et al. |
| 4,001,771 A | 1/1977 | Amrine et al. |
| 4,107,660 A | 8/1978 | Chleboun |
| 4,158,832 A | 6/1979 | Barnes, Jr. et al. |
| 4,241,338 A | 12/1980 | Spirig |

(Continued)

*Primary Examiner* — Jennifer Mehmood
*Assistant Examiner* — Fekadeselassie Girma
(74) *Attorney, Agent, or Firm* — Wolf, Greenfield & Sacks, P.C.

(57) ABSTRACT

A system to detect subsurface activity. The system employs vibration sensor pairs, with each sensor pair having a shallow sensor and a deep sensor. Outputs of the sensors of a pair are processed together and events are detected based on the relative values detected by the sensors of the pair. When signal energy departs from a detected background level, the relative amplitude and frequency content of vibrations measured at the shallow and deep sensors may be compared. The comparison may be performed, at least in part, using a classifier that discriminates between subsurface activity and surface activity. The outputs of sensor pairs may be aggregated to make a determination of whether subsurface activity exists and/or its location. Aggregation may involve comparing the outputs of the same sensor pair at multiple time intervals or may involve comparing the outputs of arrayed sensor pairs.

19 Claims, 5 Drawing Sheets

(56) References Cited

U.S. PATENT DOCUMENTS

| | | |
|---|---|---|
| 4,270,122 A | 5/1981 | Capula |
| 4,374,378 A | 2/1983 | Lee |
| 4,536,753 A | 8/1985 | Parker |
| 4,591,834 A | 5/1986 | Kyle |
| 4,953,144 A | 8/1990 | Chin et al. |
| 4,975,891 A | 12/1990 | Wineland et al. |
| 5,455,562 A * | 10/1995 | Chin .............................. 340/547 |
| 5,581,514 A * | 12/1996 | Moldoveanu et al. .......... 367/16 |
| 7,202,797 B2 | 4/2007 | Zhavi |
| 7,889,075 B2 * | 2/2011 | Winkler et al. ............... 340/550 |
| 2007/0008123 A1* | 1/2007 | Swanson ........................ 340/541 |
| 2009/0290448 A1* | 11/2009 | Vassallo et al. ................. 367/21 |
| 2009/0309725 A1* | 12/2009 | Berger et al. .................. 340/566 |
| 2011/0169638 A1* | 7/2011 | Krumhansl et al. .......... 340/566 |

\* cited by examiner

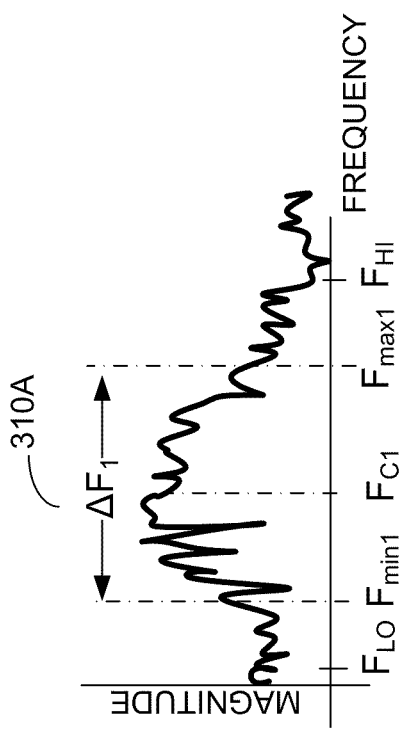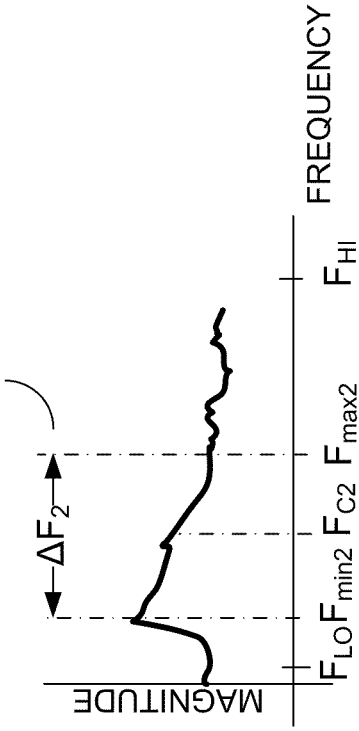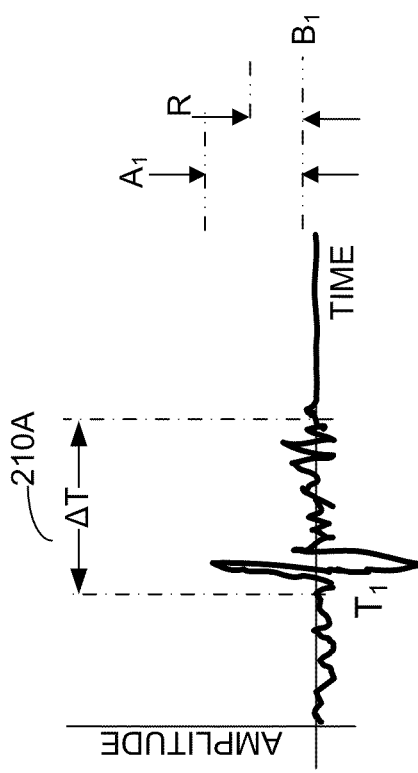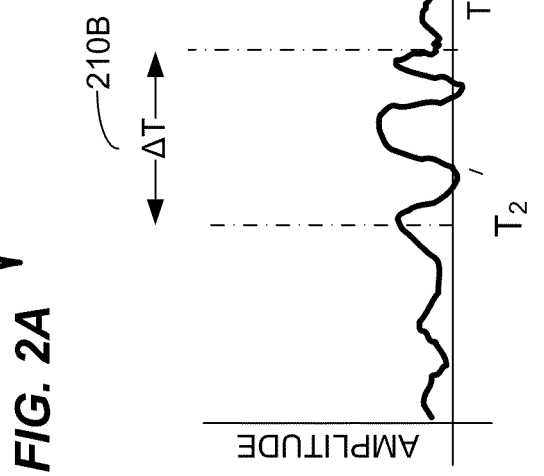
FIG. 2A
FIG. 2B
FIG. 3A
FIG. 3B

SUBSURFACE INTRUSION DETECTION SYSTEM

RELATED APPLICATION

This application is a non-provisional of U.S. Application No. 61/151,084, filed Feb. 9, 2009 incorporated herein by reference.

FEDERALLY SPONSORED RESEARCH

This invention was made by an agency of the United States Government or under a contract with an agency of the United States Government, Contract Number: Army—W9124Q-05-C-0035.

BACKGROUND

This invention relates to security systems and more specifically to systems that can detect tunneling or other subsurface activity.

In many instances, it is desirable to secure a boundary. One aspect of securing a boundary is surveillance, which entails identifying when people or objects cross the boundary so that unauthorized movement across the boundary can be prevented. The boundary could be a national border, in which case surveillance may be used to prevent smuggling or illegal immigration. As another example, the boundary could be the perimeter of a secured facility, in which case surveillance may be used to prevent thieves or terrorists from gaining access to the facility. Though, boundary surveillance may also be used to prevent people from leaving a facility, such as a prison.

Various approaches are known for providing surveillance along a boundary. A traditional approach has been to deploy people along the boundary to observe activity. Electronic monitoring has also been employed, including with video cameras or heat detectors.

However, surveillance techniques that involve observing someone or something crossing the boundary can be thwarted by tunneling below the surface of the boundary. To detect such subsurface activity, systems have been developed in which vibration sensors are deployed along the boundary. The outputs of the vibration sensors are taken as an indication of underground activity and can therefore be used to detect the digging of tunnels or activity within tunnels, which indicates secretive attempts to cross the boundary. However, existing systems have a high false alarm rate from acoustic, RF and surface events.

SUMMARY

The inventors have recognized and appreciated that the false alarm rate of a subsurface activity detection system can be improved through the use of groups of vibration sensors that are deployed with each group having at least a shallower and a deeper sensor. Signal processing to compare relative values for features of the vibrations at related times, detected at each of these sensors provides an accurate indication of subsurface activity. The features compared may include one or more of amplitude, duration and frequency content of the vibrations or other timing metrics or other frequency-domain metrics, In some embodiments, for example, the features compared are amplitude, duration and frequency content. The processing distinguishes between surface activity and subsurface activity, thereby reducing the false alarm rate of the system.

In one aspect, the invention relates to a method of detecting subsurface activity. The method includes receiving vibrations with a first sensor positioned at a first depth relative to a surface of the earth to generate a first signal and receiving vibrations with a second sensor positioned at a second depth relative to the surface of the earth to generate a second signal. The second depth is greater than the first depth. An event is detected based on a comparison of values of parameters representing features of the vibrations during corresponding time windows of the first signal and the second signal. An output indicates detection of the event.

In another aspect, the invention relates to a system for detecting underground activity. The system has a first sensor located at a first depth below the surface of the ground and a second sensor located at a second, deeper, depth below the surface of the ground. The first sensor has a first output indicative of vibrations at the first depth, and the second sensor has a second output indicative of vibrations at the second depth. A processor adapted to detect underground activity compares values of parameters, such as those representing amplitude and frequency of signals at the first output and the second output.

In yet another aspect, the invention relates to computer-executable instructions encoded on a computer storage medium. When executed, the computer-executable instructions implement a method of subsurface activity detection that includes receiving a signal from each of a plurality of vibration sensors positioned to measure vibrations of the earth. The plurality of vibration sensors comprise at least an upper sensor and lower sensor at a location. Each signal represents a measured vibration measured with a respective vibration sensor of the plurality of vibration sensors. As part of the method, an interval is identified in which the signal from the lower sensor and/or the upper sensor exceeds a threshold. For the identified interval, an indication of signal features, such as the amplitude, duration of a signal level above a threshold and frequency content, of the signals from the upper sensor and the lower sensor is computed and these values are compared. An event is indicated based on the comparison.

The foregoing is a non-limiting summary of the invention, which is defined by the attached claims.

BRIEF DESCRIPTION OF DRAWINGS

The accompanying drawings are not intended to be drawn to scale. In the drawings, each identical or nearly identical component that is illustrated in various figures is represented by a like numeral. For purposes of clarity, not every component may be labeled in every drawing. In the drawings:

FIGS. 2A and 2B illustrate time-domain signals detected by a lower and an upper sensor, respectively, in the system of FIG. 1;

FIGS. 3A and 3B represent frequency spectra associated with the time-domain signals of FIGS. 2A and 2B, respectively;

DETAILED DESCRIPTION

Figure 1:
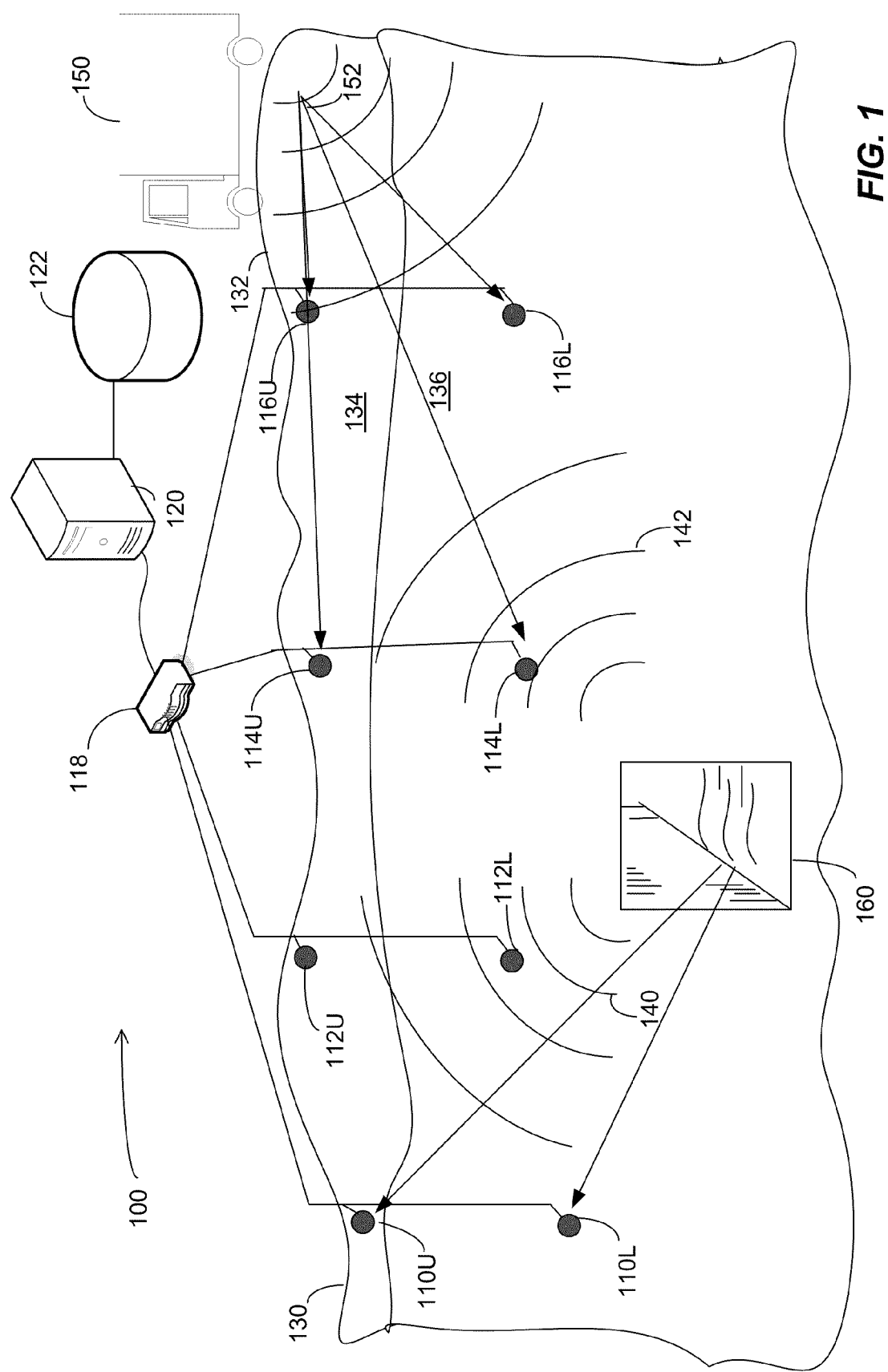
FIG. 1 is a sketch of a subsurface intrusion detection system according to some embodiments of the invention.

FIG. 1 illustrates a subsurface intrusion detection system 100 that may accurately detect subsurface activity with a low false alarm rate according to some embodiments of the invention. System 100 may be deployed along any suitable boundary and may be used to detect subsurface activity indicative of digging, unauthorized use of tunnels that pass under the boundary or other surreptitious subsurface activities. System 100 may be employed along any suitable boundary, including the border of a country, a perimeter of a secured facility, such as a prison, or any other location where subsurface activity is to be detected.

FIG. 1 illustrates a cross section through the earth 130 along the boundary. In this view, multiple vibration sensors, 110U, 110L, 112U, 112L, 114U, 114L, 116U and 116L are visible. Though FIG. 1 shows the sensors along the boundary, it is not a requirement that the sensors be deployed on the boundary. In some embodiments, the sensors may be positioned adjacent the boundary or at any other suitable location where vibrations can be detected.

System 100 may include any suitable number of vibration sensors. In this example, a total of eight sensors are illustrated. As illustrated, the sensors may be deployed in groups, with multiple sensors in each group. In the example of FIG. 1, four groups are shown, with each group containing two vibration sensors, an upper sensor and a lower sensor. As illustrated, sensors 110U and 110L form one group. Sensors 112U and 112L form a second group. Sensors 114U and 114L form a third group, and sensors 116U and 116L form a fourth group.

In the embodiment of FIG. 1, the sensors of each group are generally aligned vertically such that sensors within each group are at different depths below surface 132. Accordingly, sensors 110L, 112L, 114L and 116L are at a deeper depth than sensors 110U, 112U, 114U and 116U, respectively. The specific depth of each sensor is not critical to the invention. However, in some embodiments, the upper sensor in each group may be buried below the surface 132 at a depth of approximately one meter or less. In contrast, the lower sensor of each group may be buried below surface 132 at a depth of three meters or greater. As one example, in some embodiments, the lower sensor of each group may be buried approximately six to ten meters below surface 132. In some embodiments, the vertical separation between the lower and upper sensor or each group may be on the order of approximately three meters or greater.

In the embodiment illustrated in FIG. 1, earth 130 includes a surface layer 134, such as top soil, and a lower layer 136. In some scenarios, upper layer 134 may propagate vibrations differently than lower layer 136. In some embodiments, the depth of the upper and lower sensors of each group may be selected such that the upper sensor is within upper layer 134 and the lower sensor is within lower layer 136. This positioning may ensure that the upper sensors preferentially receive vibrations associated with surface activities while the lower sensors preferentially receive vibrations associated with subsurface activities. However, any suitable approach may be used to determine relative positioning of the upper and lower sensors of each group.

Groups of sensors may be arrayed along the border in any suitable pattern. In some embodiments, groups are spaced by a horizontal distance of approximately ten to twenty meters. However, in some embodiments, greater separation between sensor groups may be possible. For example, in some embodiments adequate signal levels may be achieved with a separation between groups of sensors of forty to fifty meters.

Sensors may be installed by inserting them into holes bored earth 130, though any suitable installation approach may be used. In some embodiments vertical alignment of sensors in a group may be achieved by inserting the group into the same hole. However, vertical alignment is not a requirement. Horizontally drilled holes can be used to install sensors at deeper depths. Though, in the illustrated embodiment, the horizontal spacing between sensors in a group is small relative to the vertical distance between sensors in the group. Such spacing allows all the sensors in a group to receive vibrations from an event in the vicinity of the sensor group in most circumstances.

Any suitable sensors may be used. For example, commercially available vibration sensors may be used in system 100. Such sensors are known in the seismic exploration art and are used, for example, for oil and other geological explorations. Such sensors are sometimes called "geophones" or "accelerometers." These sensors have a high sensitivity to low frequency seismic vibrations and can therefore detect even relatively small vibrations associated with tunneling or other subsurface activity. Though, it should be appreciated that other vibration or sound transducers may be used. Also, it should be appreciated that, in some contexts that the term "seismic vibrations" means very low, subsonic frequencies on the order of 10 Hz or less. However, in this context, "seismic vibrations" refers to signals in the ground, which can be at higher frequencies.

System 100 detects subsurface activity by processing signals output by each of the sensor groups. In the embodiment illustrated, signal processing is performed within processor 120. Processor 120 may be any suitable computing device or devices. Here, the outputs of all of the sensors are shown processed in a single processor. However, in some embodiments, separate processors may be provided for each sensor, each group of sensors or for subsets of groups of sensors.

In the embodiment illustrated, the signals output by each of the sensors are processed digitally. Accordingly, each sensor is shown connected to data acquisition unit 118. Data acquisition unit 118 may contain signal conditioning and digitizing circuitry, as is known in the art, for acquiring signals from seismic vibration sensors for digital processing.

In the example of FIG. 1, each of the sensors is wired to data acquisition unit 118. However, it is not a requirement that sensors be wired to a single data acquisition unit. In other embodiments, multiple data acquisition units may be provided, each acquiring and digitizing the output of one or more sensors. Moreover, it is not a requirement that the outputs of the sensors be provided to processor 120 using a wired connection, such as a connection made using a cable adapted to carry electrical signals or a fiber optic cable adapted to carry information encoded as light. As an example of a possible variation, the outputs may be communicated wirelessly, using any suitable radio technology. As further examples of possible variations in the data acquisition system, the sensor outputs may be communicated using analog modulation techniques, or the sensor outputs may be digitized and conveyed to processor 120 using digital communication techniques.

Regardless of the mechanism by which sensor outputs are communicated to processor 120, processor 120 may process the sensor outputs to detect patterns of vibrations characteristic of subsurface activity. In processing the signals, processor 120 may differentiate between patterns of vibration characteristic of subsurface activity and patterns of vibration characteristic of surface activities. For example, FIG. 1 illustrates a tunnel 160. Digging of tunnel 160 and/or movement of people or equipment within tunnel 160 are examples of subsurface activity that system 100 may detect. Such activity may indicate a surreptitious attempt to cross the boundary protected by system 100. Activity in digging or moving within tunnel 160 creates seismic vibrations 140 and 142, which may be detected by sensors of system 100.

FIG. 1 also illustrates surface activity. In this example, a truck 150 driving on surface 132 creates seismic vibrations 152. Vibrations 152 may also be detected by sensors of system 100.

Processor 120 may be programmed to differentiate between seismic vibrations, such as seismic vibrations 140 and 142, associated with subsurface activity and seismic vibrations, such a seismic vibrations 152, associated with surface activity. In some embodiments, processor 120 is programmed to differentiate between vibrations associated with subsurface and surface activities based on relative characteristics of the signals received at the upper and lower sensors of each of the pairs. These relative characteristics may include one or more of relative values of a first and a second signal representing vibrations received at the upper and lower sensor, respectively, of each pair. For example, these characteristics may include one or more of relative amplitude of the first and second signals, relative frequency content of the first and second signals, relative time of values above respective thresholds in the first and second signals, and relative duration of values of the first and second signals above the respective thresholds. Though, it should be appreciated that any suitable characteristics may be used.

FIGS. 2A and 2B are graphs of detected signal characteristics that illustrate processing that may be performed to identify events associated with subsurface activity. FIG. 2A is a sketch of a signal received at a lower sensor of a sensor group. FIG. 2B is a sketch of a signal received at an upper sensor in the corresponding sensor group.

The time domain signals in FIGS. 2A and 2B represent sensor outputs during the same time interval. In these figures, the sensor outputs are illustrated as a plot of signal energy versus time. During the time interval illustrated, an event has occurred, generating vibrations detected by the sensors and reflected in the sensor output signals as illustrated. In the signal of FIG. 2A, the event occurs at time $T_1$ and lasts for a time $\Delta T$.

An event may be recognized in a time domain signal in any suitable way. In this example, the time domain signal energy is computed and has a baseline value $B_1$ and the event may be recognized by a substantial departure from the baseline value. During event window 210A, the signal of FIG. 2A extends above baseline $B_1$ by an amount $A_1$. A signal processing system, such as processor 120 (FIG. 1), may detect an event if, during some window of time, an average signal energy exceeds a baseline value by more than a threshold amount. For example, a threshold amount R may be established. Once an event has been recognized because a signal value exceeds the baseline $B_1$ by more than the threshold amount R, the starting and ending time of the event may be identified such that the event window 210A may be established.

Any suitable techniques may be employed to determine the baseline value $B_1$, the threshold amount R and the starting and ending times of the event window. As one example, the baseline value $B_1$ may be determined by averaging values of the received signal over a period of time that is long relative to the duration of an event. As is known in the signal processing art, such averaging may be achieved using a filter, which may be implemented as either analog or digital filter. As another example, the threshold R may be established in advance based on an expected magnitude of seismic vibrations associated with subsurface activity indicative of unauthorized attempts to tunnel across the boundary protected by system 100. Alternatively, the threshold R may be determined dynamically based on measured vibration values. For example, the sensor output may be monitored over a relatively long interval of time. Variations in the signal amplitude when no event is present may be represented as a statistical parameter, such as the standard deviation. The threshold may be set as a multiple of the standard deviation.

To establish the boundaries of event window 210A, once a point in time is established where a detected signal level exceeds the threshold R for a sufficient duration to constitute an event, points at which the received signal departs from the baseline before threshold crossing and returns to the baseline value after that threshold crossing may be identified. These points may be taken as the beginning and the end of the event. However, any suitable techniques may be employed for identifying events and event windows, including signal processing techniques that are known in the art.

Once an event window is established based on the output of the lower sensor in a group, a corresponding event window may be identified in the signal output by the upper sensor in the group. FIG. 2B illustrates an event window 210B established for a signal output by the upper sensor of a group. As can be seen, in FIG. 2B, during the event window 210B, the signal received at the upper sensor is above the baseline $B_2$ that can be established for the upper sensor by a maximum amount $A_2$.

In the example illustrated, event windows 210A and 210B occur at approximately the same time. However, event window 210B may occur at a slightly later time than event window 210A. Such a condition may occur, for example, if the event is triggered by subsurface activity closer to the lower sensor than to the upper sensor. In this scenario, the propagation time from the source of the seismic vibrations to the upper sensor will be longer than the propagation time to the lower sensor. Of course, if the event giving rise to the seismic vibration is closer to the upper sensor than to the lower sensor, the event window and the output of the upper sensor may occur before the event window and the output of the lower sensor. Though, this may not always be the case because the propagation velocity of a seismic vibration may be faster in the deeper layer such that a surface event may generate an output at the deeper sensor before an output at the upper sensor.

In the example illustrated in FIG. 2B, the output of the upper sensor stays above the baseline $B_2$ for longer than the time $\Delta T$. This condition may result from smearing or dispersion of the vibration signals as they propagate through earth 130. Accordingly, the event window required to capture the event signal at the upper sensor may be different than the event window required to capture the event signal at the output of the lower sensor. Signal processing techniques could be employed to separately identify and correlate event windows for signals output by the upper and lower sensors. However, because the event windows occur at approximately the same time for sensors that are deployed as a group, in some embodiments, a suitable event window may be established for both signals. Once an event is detected, the event windows for both the lower and upper sensor signals can span the same time interval if the window is long enough to capture an adequate portion of an event signal in both sensor outputs to allow a comparison to be made between the signal characteristics associated with an event in the output of the lower sensor and the output of the upper sensor. Such a selection, for example, may be made by defining an event window that is long enough to reflect any differences in propagation time or signal smearing between the upper and lower sensors. An event window may be expressly identified. However, sensors may identify signals by measuring the duration of the energy envelop that exceeds a threshold above the background level on both the upper and lower sensors.

A comparison of the signals in FIGS. 2A and 2B illustrates processing that can be performed to generate features that can be used to classify an event as one associated with surface activity or subsurface activity. One such parameter is the starting time of a detected event window. As noted above, when a subsurface event occurs, the source of seismic vibrations associated with that event is likely closer to the lower sensor in sensor groups near the subsurface activity. The path from the source of seismic vibrations to the lower is also in the deeper layer, which has faster velocity. As a result, the starting time $T_1$ of an event window, such as event window 210A, is before a corresponding starting time $T_2$ of an event window 210B. As a result, a relative difference in starting times between corresponding event windows in the outputs associated with a lower sensor and an upper sensor in a sensor group may provide an indication that a detected event should be classified as an event associated with subsurface activity.

Another parameter that may be used to classify events is the relative amplitude of the event signals received at the lower sensor and the upper sensor in a sensor group. For example, the signal of FIG. 2A departs from its baseline $B_1$ by an amount $A_1$. In contrast, the signal of FIG. 2B departs from its baseline $B_2$ by an amount $A_2$. In the scenario illustrated in FIGS. 2A and 2B showing the output produced in response to the same event, the change in amplitude $A_1$ is larger for the lower sensor than the change in amplitude $A_2$ for the upper sensor. Without being bound by any particular theory of operation, such a difference in amplitude may occur because of the relatively larger attenuation of seismic vibrations in upper layer 134 in comparison to the attenuation of the vibrations in lower layer 136. Vibrations initiated by activity in lower layer 136, such as vibrations 140 and 142, must travel through at least a portion of upper layer 134 to reach one of the upper sensors, such as upper sensors 110U, 112U, 114U and 116U. Vibrations propagating to one of the lower sensors, such as 110L, 112L, 114L or 116L, do not travel through upper layer 134 and therefore may be attenuated less. These vibrations from subsurface activity are likely to have a larger amplitude upon reaching the lower sensor of a sensor group than they do upon reaching an upper sensor of the same group. In contrast, vibrations, such as vibrations 152 caused by surface activity must travel at least partially through upper layer 134 to reach either the upper or lower sensor of any of the sensor groups. As a result, vibrations are unlikely to give rise to signal events in which the change in amplitude is greater for the lower sensor than for the upper sensor. Thus, relative amplitude, in comparison to respective baselines, of signals at the upper and lower sensors of a group may be one parameter used in classifying signals as being associated with a subsurface event. Alternatively or additionally, a comparison of absolute signal levels of detected vibrations between the upper and lower sensors may be a parameter. Such a comparison may be made in either the time or the frequency domain.

FIGS. 3A and 3B illustrate other parameters that may be used to classify event signals as being associated with subsurface activities. FIGS. 3A and 3B illustrate frequency spectra of the time domain signals of FIGS. 3A and 3B, respectively, during an interval of time that includes an event window. A frequency spectra may be generated from a time domain signal in any suitable way. For signals that are processed digitally, one approach for generating a frequency spectrum from a time domain signal is called a fast fourier transform (FFT). However, any suitable time to frequency domain transform may be used in processing signals received by the sensors.

A comparison of FIGS. 3A and 3B illustrates characteristics in the frequency domain that may be used to classify an event signal as one associated with subsurface activity.

A time domain signal is generally made up of energy at multiple frequencies. The frequency spectrum associated with the time domain signal is an indication of the frequencies at which that energy occurs. In the spectrum of FIG. 3A, substantial portions of that energy appears in the spectral window 310A, which extends from a lower frequency $F_{min1}$ to an upper frequency $F_{max1}$. Similarly, in the spectra of FIG. 3B, substantial amounts of the energy occur at frequencies in the spectral window 310B, which extends from frequency $F_{min2}$ to $F_{max2}$.

Spectral windows, such as 310A and 310B, may be identified in the frequency spectra in any suitable way. For example, as with processing of time domain signals, a baseline value can be identified and the boundaries of a spectral window can be determined by identifying frequencies at which the spectral energy exceeds the baseline by some threshold amount. Other, techniques as are known in the art for identifying a spectral window may also be suitable. Applicants have recognized and appreciated that subsurface activity generates sensor output signals having a frequency spectra in which the signal energy is concentrated in a range of frequencies, indicated in FIGS. 3A and 3B as spanning from a frequency of $F_{LO}$ to $F_{HI}$. In some embodiments, $F_{LO}$ is above 50 Hz and $F_{HI}$ is below 500 Hz. For example, the lower frequency of the range may be approximately 80 Hz. Though, in some embodiment, 100 Hz may be used as the lower frequency in the range. Similarly, 400 Hz or 350 Hz may be taken as the upper end of the range. Though, in some embodiments, 300 Hz may be taken as the upper limit of the range. As a specific example, 100-300 Hz may be taken as the range of frequencies characteristic of subsurface activity. Accordingly, if the frequency spectrum generated from an event extracted from a time domain signal is concentrated in the range of frequencies associated with subsurface activities, a further indication is provided that the detected signal event is associated with subsurface activity.

Frequency domain parameters indicating that the spectral window associated with an event falls within the range of frequencies associated with subsurface activity may be used to classify an event signal as the result of subsurface activity or not associated with subsurface activity. Any suitable frequency domain parameter may be used for such classification. In some embodiments, such parameters may be obtained by processing only the spectrum associated with an output from a lower sensor in a group. However, in other embodiments, parameters derived from spectra associated with multiple sensors in a group may be used to classify an event as either a subsurface event or not a subsurface event.

One frequency domain parameter that may be used in classifying event signals is the amount of the spectral window 310A that overlaps the range of frequencies expected for vibrations generated by subsurface activities. Such a determination may be made in any suitable way. For example, a determination may be made whether the center frequency $F_{C1}$ falls within the expected range between $F_{LO}$ and $F_{HI}$. As an alternative, the total percentage of the spectral energy of the spectrum of FIG. 3A falling in the range between $F_{LO}$ and $F_{HI}$ may also be used for classifying event signals. Though, other parameters are possible. For example, the percentage of spectral window 310A falling in the range between $F_{LO}$ and $F_{HI}$ may also be used in classifying event signals, with higher percentages indicating a higher likelihood that a detected event is associated with substantial activity.

Another characteristic that may be used in classifying event signals is the relative frequency of an event signal as detected at the lower sensor of a group relative to the upper sensor of a group. As can be seen by comparing FIGS. 3A and 3B, the spectrum of the event as detected by the lower sensor has energy at higher frequencies than the spectrum associated with the upper sensor, as illustrated in FIG. 3B. While not being bound by any particular theory, lower layer 136 of the earth may be more densely packed than upper layer 134. Accordingly, lower layer 136 may propagate higher frequency seismic vibrations better than upper layer 134. As a result, vibrations, such as vibrations 140 and 142 emanating from within lower layer 136, will travel through layer 136 to the lower sensors of each sensor group. To reach the upper sensor of a group, the vibration signals pass through upper layer 134. In upper layer 134, the higher frequency components to the vibration signals may be attenuated to a greater extent than lower frequency components and less than the higher frequency component of the signals propagating to the lower sensor. Consequently, the spectrum of the vibrations received at the upper sensor of each group has less higher frequency components than the vibration signals received at the lower sensor of the corresponding sensor group.

For a vibration signal 152 emanating at the surface 132, the vibration signal will travel to an upper sensor 114U mostly in the upper layer 134, and only a portion of the path length in the upper layer to reach the lower sensor 114L of the corresponding sensor group. As the distance from the surface source to the sensor group increases, a proportionally higher proportion of the path to the upper sensor is in the upper layer compared to the path to the lower sensor. Because of the additional travel through the upper layer 134, the attenuation of the high frequency components will be significantly greater for signals at the upper sensor than for the signals travelling to the lower sensor in the group. Accordingly, a parameter reflecting the relative amount of high frequency components associated with an event signal as detected at the lower sensor of a group relative to the event signal as detected at an upper sensor of a group may be used in classifying the event as associated with a subsurface event.

Any suitable parameter may be used to represent the relative amount of high frequency content in an event signal detected at a lower sensor of a group and the upper sensor of a group. A comparison of FIGS. 3A and 3B illustrate some parameters that may be used. As one example, FIG. 3A shows that spectral window 310A extends to a frequency $F_{MAX1}$ while spectral window 310B extends only to an upper frequency $F_{MAX2}$. Accordingly, the relative values of the upper limits of spectral windows may be used as a parameter in classifying event signals.

As another example, FIGS. 3A and 3B illustrate that the spectrum of FIG. 3A associated with a lower sensor of a group has a spectral window with a center frequency $F_{C1}$ that is higher than the center frequency $F_{C2}$ of the spectral window 310B associated with the event signal detected by the upper sensor of the group. Accordingly, a ratio between center frequencies may alternatively or additionally be used as a parameter in classifying event signals. Alternately, a ratio between spectral energies summed in a specified band may be used in classifying event signals.

The foregoing are examples of parameters that may be used in classifying event signals. However, any suitable frequency domain parameters may be used. Other suitable spectral features that may be computed include total spectral energy, center of gravity, spectral variance, spectral skewness, spectral kurtosis and frequency of highest energy.

Different or additional time domain parameters similarly may be used in classifying event signals. As described above, a ratio of maximum amplitude of an event signal received at an upper sensor and a lower sensor may yield a parameter for classifying event signals. As described above in connection with FIGS. 2A and 2B, a normalized amplitude may be used for the comparison. A normalized amplitude results by offsetting each signal by its own base line, $B_1$ and $B_2$, respectively. Though, other normalization approaches may be used.

Figure 4A:
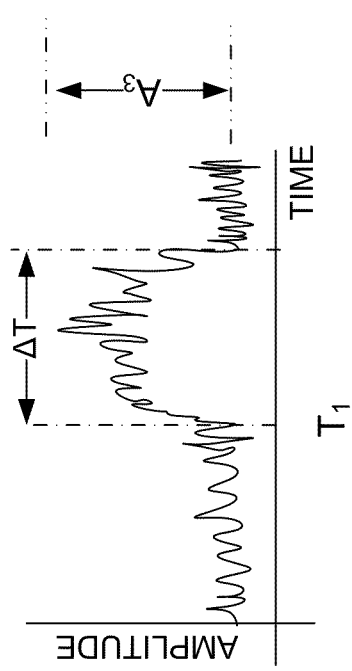
FIGS. 4A and 4B illustrate an approach to processing a time-domain signal according to an alternative embodiment of the invention.
Figure 4B:
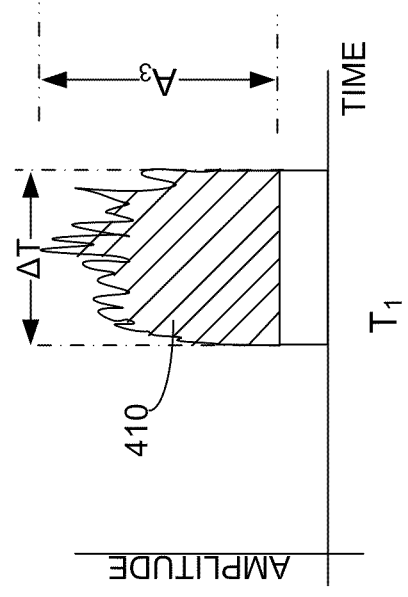

FIGS. 4A and 4B illustrate an alternative parameter that may be used for classification. As shown, the area under the signal curve during an event window may be computed for the signals output by each sensor in a sensor group. For example, FIG. 4A illustrates a sensor output with an event window starting at $T_1$. The area 410 under the signal curve during that event window is illustrated in FIG. 4B. In some embodiments, a parameter useful in classifying event signals may be obtained by taking the ratio of signal areas during an event as measured at an upper sensor and a lower sensor. As with the embodiments in FIGS. 2A and 2B, the area, such as area 410, may be computed on a normalized signal. In the example of FIG. 4B, area 410 includes only the area above the base line and is therefore normalized.

Other parameters alternatively or additionally may be computed for time domain signals and used for classifying events. For example, time domain zero crossings of detected events, simultaneous rate of detection and long term rate of detection of events may be computed for time domain signals. These parameters may then be used in classifying events as related to subsurface activity or not.

In some embodiments, prior to comparing parameters of either time domain signals or frequency domain spectra associated with identified events, suitable signal processing may be performed. The processing may compensate for noise, differences in sensor gain, or other factors that may effect either the amplitude or spectral content of an electronic signal representing detected vibrations. Further, the inventors have recognized and appreciated that different types of subsurface activities may occur such that accurate detection with a low false alarm rate may be facilitated by separating sensor output into at least a transient component and a continuous wave component prior to detecting and classifying events. While not being bound by any particular theory of operation, the inventors have recognized that some subsurface activities generate impulsive event signals while other types of subsurface activities generate continuous wave signals. For example, hand digging may generate impulsive vibration signals. In contrast, drilling may generate a continuous signal over an event window. Separately identifying and classifying continuous wave and transient signals may increase the accuracy with which subsurface activities may be detected.

Figure 5:
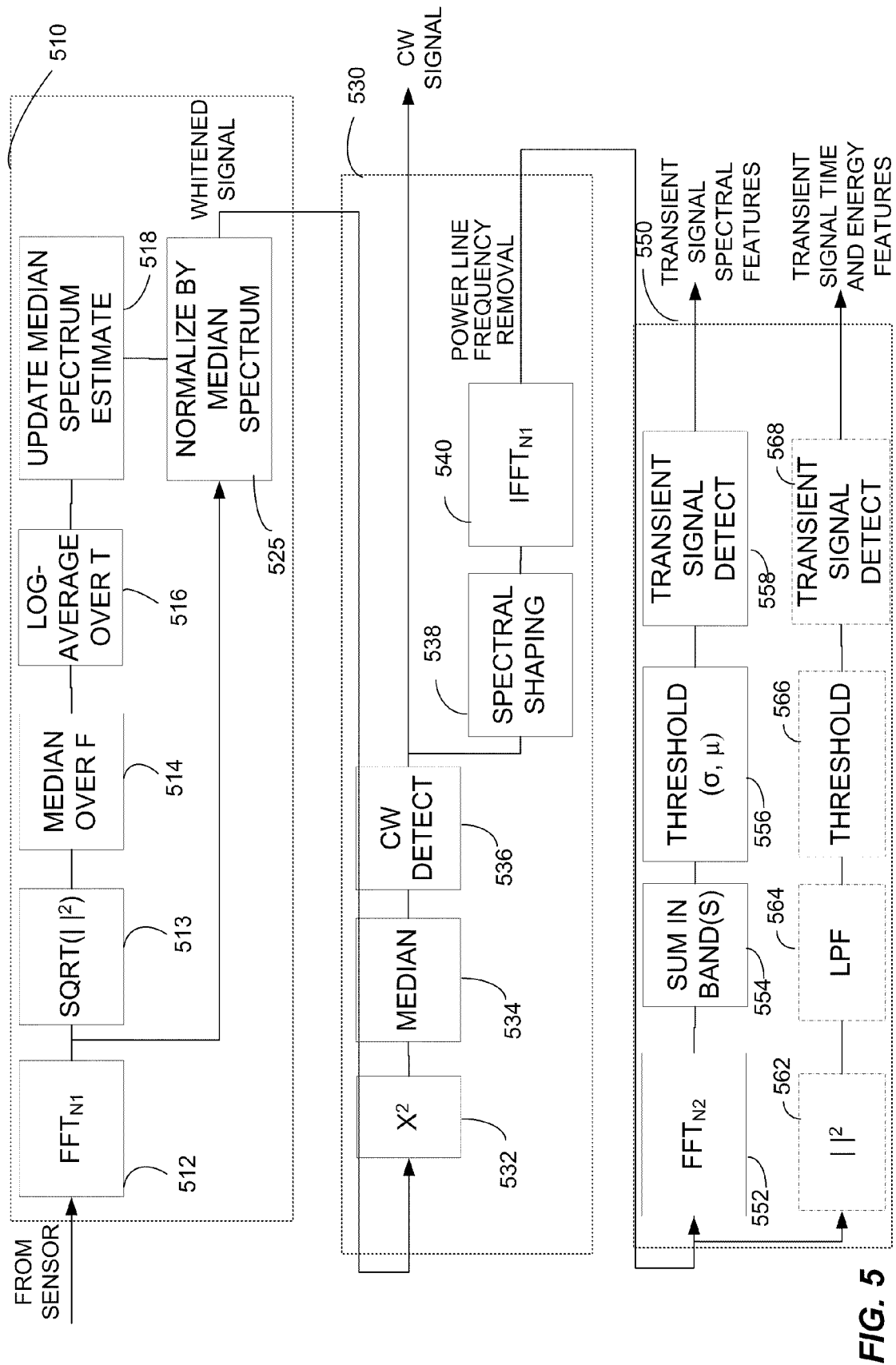
FIG. 5 is a functional block diagram of processing of a sensor signal according to some embodiments of the invention.

FIG. 5 illustrates an example of processing that may be performed on an output of a sensor to separate it into continuous wave signal and transient signal components. In system 100 (FIG. 1), the processing illustrated in FIG. 5 may be performed for each sensor output signal.

FIG. 5 is a functional block diagram of the processing to be performed on each sensor output. The processing represented by each block in FIG. 5 may be performed by a circuit within processor 120. Alternatively, some or all of the functions illustrated in FIG. 5 may be performed based on programming of a special purpose processor, such as a digital signal processor chip, contained within processor 120. As a further alternative, some or all of the functional blocks illustrated in FIG. 5 may be implemented by software programming of a general purpose processor. Accordingly, the specific means for processing a signal is not critical to the invention.

In the embodiment of FIG. 5, a sensor output may be first processed within block 510 to generate a frequency spectrum for the background noise. In the embodiment illustrated, a normalized frequency spectrum is generated.

Within block 510, in this example, the sensor output is first transformed into the frequency domain by processing at block 512. Block 512 computes a fast Fourier transform (FFT) of the signal. In this example, the FFT computed at block 512 is based on N1 points.

In the embodiment illustrated, the input from the sensor received at block 512 is in the form of periodic samples. For an N1 point FFT, N1 samples may be input into block 512. As samples are received from a sensor, block 512 processes them in sequential groups of size N1. The value of N1 may depend on a desired frequency resolution for processing in the frequency domain and may be selected using techniques as are known in the art or in any other suitable way.

In system 100 (FIG. 1), samples are taken continuously over time such that the boundary may be continuously monitored. Accordingly, block 510 will continuously output values representing the frequency spectrum of the sensor output over an interval in which N1 successive samples are taken. This frequency spectrum will be recomputed as new groups of N1 samples are provided to block 510.

Processing within block 510 normalizes each computed frequency spectrum by an estimate of the background noise. In this example, the frequency spectrum is normalized based on an estimate of the median smoothed, time averaged spectrum. To compute a median spectrum estimate, the outputs of block 512 are processed beginning at block 513.

At block 513, the outputs of block 512, the complex coefficients, are squared and then the square root of these values are computed. In the example of FIG. 5 in which an N1 point FFT is computed, block 512 will have N1 outputs. Each output may be separately processed at block 513. Accordingly, block 513 represents frequency components, as computed by the FFT in block 512, all of which are positive real values.

The frequency components from block 513 are processed at block 514, where a median smoothed frequency spectrum is identified. For each FFT computed at block 512, a different median spectrum may be identified at block 514.

At block 516, the successive median smoothed spectra computed at block 514 are averaged over time. In this example, a log-average function is used. Though, any suitable averaging function may be employed.

As the log-average computed at block 516 changes, the median spectrum background noise estimate may be updated as a result of processing at block 518. When the estimate of the median spectrum estimate changes, processing at block 518 may alter the processing at block 525 such that the normalization performed at block 525 will be based on the updated median spectrum estimate.

Any suitable approach may be used at block 525 to normalize the frequency spectrum computed at block 512 based on the estimate of the background noise spectrum. As one example, the frequency components computed at any given time could be divided by the averaged median spectrum. This process is sometimes called "whitening." Though, any suitable normalization processing may be used, including normalization processing as is known in the art may be used.

Once a normalized spectrum is computed at block 525, the spectrum may be provided to block 530 where a continuous wave signal is extracted. In the example illustrated, processing at block 530 is performed using a frequency spectrum with the same frequency resolution used for processing in block 510. If a different frequency resolution is desired, a frequency spectrum with a different number of points may be generated by performing an inverse FFT of order N1 on the output of block 525 to regenerate a time domain signal. That time domain signal could then be converted to a frequency spectrum of any desired resolution by performing an FFT with a number of points providing the desired frequency resolution. However, such processing is not illustrated in FIG. 5 for simplicity.

In the embodiment illustrated in FIG. 5, block 530 identifies a continuous wave signal by first squaring the frequency components of the normalized spectrum at block 532. This step converts the frequency spectrum to a power spectrum. At block 534 the median values of the components of the power spectrum are computed at block 534. At block 536 continuous wave signals are detected. Any suitable approach may be used to detect continuous wave signals. As one example, continuous wave signals may be detected by identifying frequency components that have a relatively large power compared to the median smoothed spectrum and persist over relatively long periods of time.

Regardless of the manner in which a continuous wave signal is detected, the sensor output values being output at a time when a continuous wave signal is detected may be recorded as representative of the continuous wave signal. That continuous wave signal may be output for further processing. As described above, the signals may be processed to identify events and derive parameters associated with the event signals. The parameters may then be used for classifying the event as one associated with subsurface activity or an event associated with some other source of seismic vibrations.

Additionally, the detected continuous wave signal may be used in identifying a transient portion of the signal output by a sensor. Accordingly, FIG. 5 illustrates further processing of the power spectrum of the sensor output. At block 538, spectral shaping is performed. This spectral shaping may modify the power spectrum to better represent a transient signal. Processing at block 538 may remove from the power spectrum frequency components associated with a detected continuous wave signal. Additionally, processing at block 538, for example, may include band pass filtering to emphasize frequency components in the range associated with subsurface activities. Such filtering may be performed, for example, by removing from the power spectrum frequencies outside of the range $F_{LO}$ to $F_{LO}$ defining the range of frequencies associated with subsurface activity. Also, power line frequencies, or frequencies associated with other known or anticipated noise sources, may be removed.

Regardless of the specific processing performed at block 538, the resulting spectrum may be converted to a time domain signal. Accordingly, FIG. 5 illustrates the output of block 538 being provided to block 540 where an inverse fast fourier transform (IFFT) is performed.

The resulting time domain signal is provided to block 550 where processing to identify a transient signal is performed. Any suitable mechanism may be used to identify a transient signal. Moreover, that processing may be performed in either the time domain or the frequency domain. FIG. 5 illustrates processing in the frequency domain and also indicates an alternative processing path in which processing is performed in the time domain.

For processing in the frequency domain, the signal input to block 550 is applied to block 552 where an FFT is performed. In this example, the FFT performed at block 552 has N2 points. Performing an inverse FFT at block 540 followed by an FFT at block 552 allows frequency domain processing within block 550 to be performed at a different frequency resolution than is used to detect a continuous wave signal in block 530. In embodiments in which the same resolution is desired, the FFT performed at block 552 may be omitted and frequency domain processing may be based on the frequency spectrum computed at block 538. Accordingly, it should be recognized that FIG. 5 depicts processing according to some embodiments, but other embodiments are possible.

Regardless of the manner in which the frequency spectrum used to detect a transient signal is generated, the spectrum may be processed at block 554. At block 554, frequency components of the spectrum are aggregated into multiple frequency bands, each band containing adjacent frequency components in a sub-range of frequencies for which a spectrum is generated. In this example, the spectral power in each band is derived by summing the energy of the frequency components within the band.

At block 556, each band may be processed to determine whether the signal in the band exceeds a threshold. The threshold for each band may be determined in any suitable way. In the embodiment illustrated, the threshold is determined by tracking for each frequency band a mean and standard deviation of band energy as successive groups of samples are processed. A frequency band may be deemed to exceed the threshold when, at any given time, the summed value for the band exceeds the mean by more than a set parameter times the standard deviation. The number and/or distribution of frequency bands exceeding their respective thresholds at any given time may be used to determine whether a transient signal is present.

Processing at block 558 may recognize a pattern of frequency bands exceeding their respective thresholds that indicates a transient signal is present. For example, a transient signal may have frequency components over a wide frequency range. Accordingly, processing at block 558 may identify a transient signal when the power in a large percentage of the frequency bands defined at block 554 exceeds the thresholds for the frequency bands. Though, any suitable criteria may be defined for detecting a transient signal.

When, as indicated by processing at block 558, a transient signal is detected, the time domain samples input to block 510 that gave rise to the indication of a transient signal may be processed, as described above in conjunction with FIGS. 2A, 2B, 3A and 3B to identify features to characterize whether the transient signal indicates a subsurface event.

FIG. 5 also indicates an alternative approach for detecting a transient signal, which may be used instead of or in addition to the processing at blocks 552, 554, 556 and 558. In this example, processing at blocks 562, 564, 566 and 568 is performed in the time domain. Like the frequency domain processing described above, time domain processing may also produce an indication of a transient signal in the sensor output.

The time domain processing may begin at block 562 where the time domain signal generated as a result of the inverse fourier transform computed at block 540 is processed. At block 562, that time domain signal may be squared, to generate a value representative of signal power. The squared signal may then be filtered by a low pass filter at block 564. The filtered signal may then be compared to a threshold at block 566. Processing at block 568 may indicate a transient signal has been detected when the filtered signal exceeds a threshold.

In this example, low pass filtering at block 564 may serve to remove noise. Thresholding at block 566 may be based on an observed range of the filtered signal. As with processing at block 556, the threshold in block 566 may be set by computing the mean and standard deviation of the time domain signal. Regardless of the manner in which the threshold is determined at block 566, if the threshold is exceeded, block 568 may output an indication that a transient signal has been detected.

The processing illustrated in FIG. 5 may be performed for each sensor in each sensor group. The resulting output signals may be processed to determine whether the detected event signals are associated with subsurface activity. Further processing may indicate whether the subsurface activity constitutes an unauthorized attempt to cross the boundary protected by system 100. Processing may also identify the location of the activity, which may be provided along with an indication that unauthorized subsurface activity has been detected.

Figure 6:
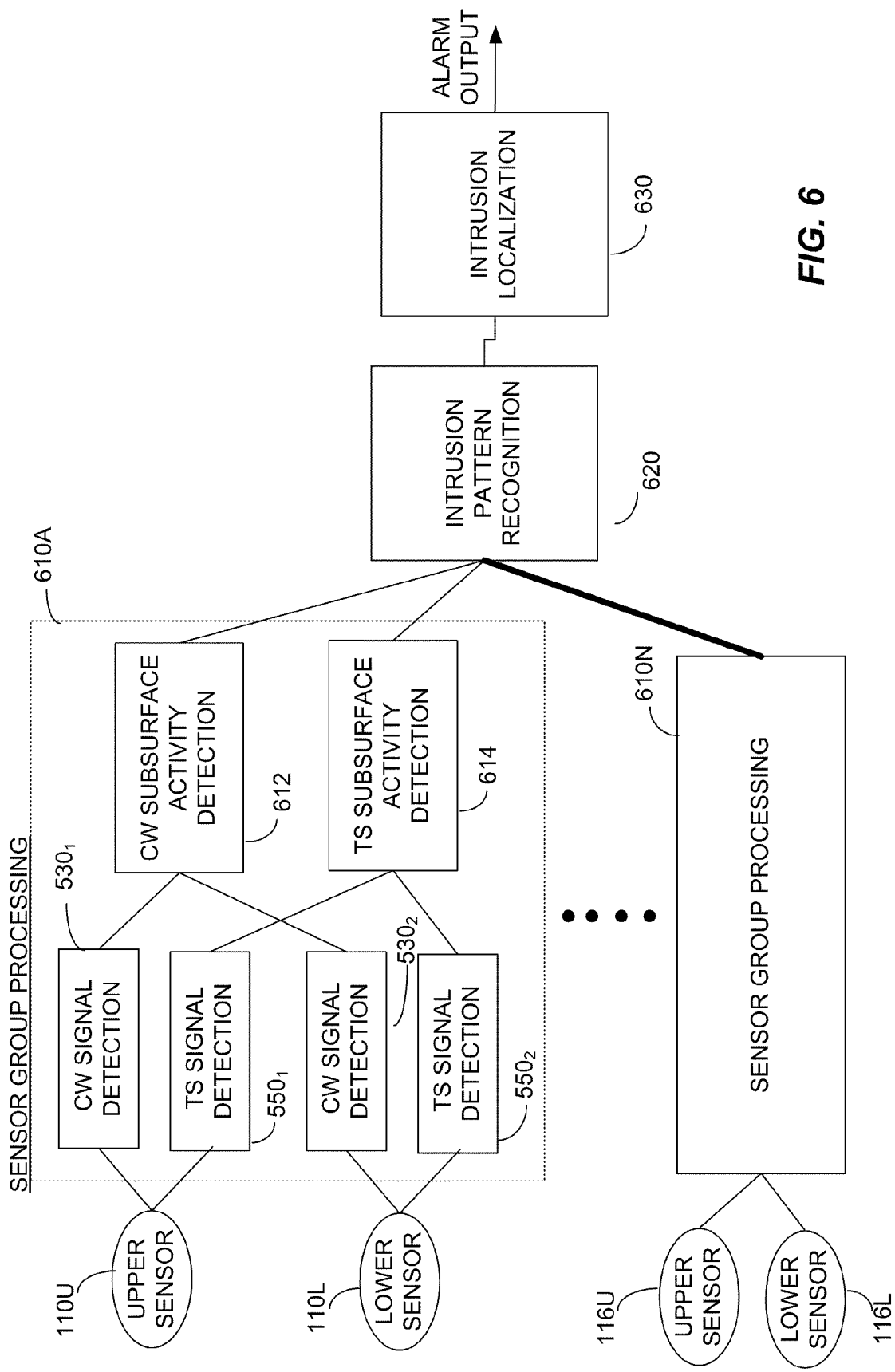
FIG. 6 is a functional block diagram of an intrusion detection system according to some embodiments of the invention.

FIG. 6 illustrates an example of processing of signals output by multiple sensor groups to produce an alarm when unauthorized subsurface activity is detected. FIG. 6 shows outputs from sensors in each group being initially processed separately. For simplicity, two sensor groups, each containing a pair of sensors, is illustrated. Here sensors 110U and 110L, forming one sensor group, and sensors 116U and 116L, forming a second sensor group, are illustrated. However, any number of sensor groups may be included in a system. In the embodiment illustrated, processing within each sensor group is the same. Accordingly, processing of only the sensor group containing sensors 110U and 110L is illustrated.

The outputs of each sensor in a group may be processed as indicated in block 610A. In the embodiment illustrated in FIG. 6, the output of each sensor in a group is first processed separately to identify continuous wave and transient signal components. Accordingly, block 610A includes processing at block $530_1$ to detect continuous wave signals in the output of upper sensor 110U. Similar processing is performed at block $530_2$ to detect continuous wave signals in the output of lower sensor 110L. At block $550_1$, processing is performed to detect transient signals in the output of upper sensor 110U. Corresponding processing is performed at block $550_2$ to detect transient signals in the output of lower sensor 110L. Processing at blocks $530_1$ and $530_2$ may be as indicated in block 530 (FIG. 5). Similarly, processing at block $550_1$ and $550_2$ may be performed as described above in connection with block 550 (FIG. 5).

When a continuous wave signal representing an event is detected, the continuous wave components of the upper and lower sensor outputs may be provided to block 612 for processing. Likewise, when a transient signal is detected at block $550_1$ or block $550_2$ the transient signal components associated with the sensors in the sensor group are provided to block 614 for processing.

As described above in conjunction with FIGS. 2A, 2B, 3A and 3B, when an event is detected in a sensor output signal, signal features may be generated for classifying the event as associated with subsurface activity or not associated with subsurface activity. These features may include time domain metrics, such as time of the event, duration of the event, and amplitude of the signal energy detected during the event, or frequency domain metrics, such as high frequency content. As a specific example, the features may be amplitude, duration and frequency content of vibrations received as part of an event. Though, any combination of one or more of these or other suitable features may be used. These metrics may be used directly to represent the features or may be used with additional processing steps, such as smoothing, filtering, scaling or determining relative values of these metrics at the upper and lower sensors.

Regardless of the specific features used for classification, processing to make the classification may be performed at block 612 when a continuous wave even signal is detected and at block 614 when a transient event signal is detected. The processing may be performed using known classification techniques. Separate classification techniques may be used for transient and continuous signal components.

As one example of a suitable approach, processor 120 may be programmed to assign an event to a class based on a range of parameter values associated with the signal. Ranges of parameter values useful for classifying a signal as associated with subsurface activity may be derived in any suitable way. One approach for deriving ranges of parameter values is processing of a set of event signals, with some signals in the set known to be represent subsurface activities and others representing other types of seismic events. This set of signals may be used as a "training set" such that ranges of parameter values that occur in most of the signals representing subsurface activities and do not occur in many of the other signals in the training set can be identified. Though, other types of classification alternatively or additionally may be used. For example, rule based classification can be performed using rules that are defined heuristically or in any other suitable way.

Any number of classes may be identified. In some embodiments, two classes may be identified for each signal component—signals associated with unauthorized subsurface activity to be detected and signals not associated with unauthorized subsurface activity. In other embodiments, more classes may be used. For example, classifications may be developed for multiple types of unauthorized subsurface activity. For example, different classifications may be develop for activities such as digging a tunnel and activities such as movement in a tunnel that has already been dug. Similarly, multiple classifications may be developed for activities that do not represent unauthorized subsurface activity. For example, different classifications may be develop for surface activities and naturally occurring seismic activity. Similarly, multiple classifications may be developed, each representing a different type of surface activity. Accordingly, the invention is not limited by the number and type of classifications used.

Regardless of the specific approach used for classification at blocks 612 and 614, when processing at block 612 or 614 classifies an event as being associated with subsurface activity, the event may be further processed at block 620. As indicated in FIG. 6, processing at block 620 receives inputs based on processing of each sensor group. Processing at block 620 may recognize patterns of sensor outputs representing an intrusion or other unauthorized subsurface activity by aggregating indications of events across multiple sensor groups and over a period of time.

Any suitable processing may be used at block 620 to recognize patterns over time or across multiple sensor groups indicating an intrusion. For example, tunneling under a boundary should result in concurrent detection of events at multiple sensor groups. Because the location of the tunnel is stationary, events associated with activity in the tunnel should repeatedly effect the same sensor groups. In contrast, a vehicle driving across the surface may effect different sensor groups over time. Accordingly, persistence and location of event signals may be used as a discriminator at block 620 to recognize patterns of event signals indicative of a subsurface intrusion.

Timing of event signals, particularly impulsive signals, may also be used to identify subsurface activity indicating an intrusion. For example, even though digging is an impulsive activity, the impulsive activities associated with digging a tunnel are likely to recur in a detectable pattern. Processing at block 620 may alternatively or additionally process the outputs of the sensor groups to identify repetitive impulsive activity indicative of an intrusion or other unauthorized subsurface activity.

Once unauthorized subsurface activity is detected, processing at block 630 may be used to localize the source of the unauthorized subsurface activity. Processing at block 630 may determine the location of subsurface activity based on the sensor groups that detect events associated with that activity. For example, FIG. 1 indicates that vibrations associated activity within tunnel 160 will be detected by the sensors such as 112L and 114L. Processing at block 630 may identify the location of tunnel 160 between the locations of sensors 112L and 114L.

Regardless of how unauthorized activity is detected and localized when such activity is detected, the system may produce an alarm output. The alarm output may indicate that a pattern of subsurface activity indicative of a subsurface attempt to cross a protected boundary has been detected. The location of the detected activity may optionally be provided as part of the alarm to facilitate investigation of the alarm.

By identifying events associated with subsurface activity based on parameters that include values characterizing a comparison between outputs of an upper and lower sensor, the resulting output may accurately indicate unauthorized subsurface activity with a relatively low false alarm rate.

Having thus described several aspects of at least one embodiment of this invention, it is to be appreciated that various alterations, modifications, and improvements will readily occur to those skilled in the art.

For example, each group of sensor is illustrated to have only two sensors. In some embodiments, additional sensors may be present in some or all of the groups. If more than two sensors are present, processing as described above in connection with pairs of sensors may be performed using two sensors at a time. Alternatively, outputs of sensors may be aggregated to produce composite signals representative of shallower and deeper vibration. Alternatively, pattern classifiers used to identify signals representative of subsurface activities may be expanded to reflect the possibility of sensors at intermediate depths between the upper and lower sensors. Such classifiers could, for example, identify a subsurface event when sensor outputs indicate monotonically increasing amplitude and center frequency with increasing depth or monotonically increasing at least to a depth at which a tunnel may be present.

As another example, signal conditioning may be employed prior to or in conjunction with signal processing as illustrated in FIGS. 5 and 6. For example, once a source of seismic vibration unrelated to unauthorized subsurface activity is detected, a signal processing may be employed to remove the effects of such known signal sources. For example, electric machinery located near a boundary may generate vibrations at harmonics of 60 Hz. These harmonics may be removed from the sensor output signals using any suitable approach. For example, a notched filter may be used for each sensor output before the sensor output is applied to block 510 (FIG. 5) for processing. Alternatively or additionally, the spectral components associated with known sources of vibration may be removed following the FFT performed at block 512 or at any other suitable point during signal processing.

Such alterations, modifications, and improvements are intended to be part of this disclosure, and are intended to be within the spirit and scope of the invention. Accordingly, the foregoing description and drawings are by way of example only.

The above-described embodiments of the present invention can be implemented in any of numerous ways. For example, the embodiments may be implemented using hardware, software or a combination thereof. When implemented in software, the software code can be executed on any suitable processor or collection of processors, whether provided in a single computer or distributed among multiple computers.

Further, it should be appreciated that a computer may be embodied in any of a number of forms, such as a rack-mounted computer, a desktop computer, a laptop computer, or a tablet computer. Additionally, a computer may be embedded in a device not generally regarded as a computer but with suitable processing capabilities, including a Personal Digital Assistant (PDA), a smart phone or any other suitable portable or fixed electronic device.

Also, a computer may have one or more input and output devices. These devices can be used, among other things, to present a user interface. Examples of output devices that can be used to provide a user interface include printers or display screens for visual presentation of output and speakers or other sound generating devices for audible presentation of output. Examples of input devices that can be used for a user interface include keyboards, and pointing devices, such as mice, touch pads, and digitizing tablets. As another example, a computer may receive input information through speech recognition or in other audible format.

Such computers may be interconnected by one or more networks in any suitable form, including as a local area network or a wide area network, such as an enterprise network or the Internet. Such networks may be based on any suitable technology and may operate according to any suitable protocol and may include wireless networks, wired networks or fiber optic networks.

Also, the various methods or processes outlined herein may be coded as software that is executable on one or more processors that employ any one of a variety of operating systems or platforms. Additionally, such software may be written using any of a number of suitable programming languages and/or programming or scripting tools, and also may be compiled as executable machine language code or intermediate code that is executed on a framework or virtual machine.

In this respect, the invention may be embodied as a computer readable medium (or multiple computer readable media) (e.g., a computer memory, one or more floppy discs, compact discs, optical discs, magnetic tapes, flash memories, circuit configurations in Field Programmable Gate Arrays or other semiconductor devices, or other tangible computer storage medium) encoded with one or more programs that, when executed on one or more computers or other processors, perform methods that implement the various embodiments of the invention discussed above. The computer readable medium or media can be transportable, such that the program or programs stored thereon can be loaded onto one or more different computers or other processors to implement various aspects of the present invention as discussed above.

The terms "program" or "software" are used herein in a generic sense to refer to any type of computer code or set of computer-executable instructions that can be employed to program a computer or other processor to implement various aspects of the present invention as discussed above. Additionally, it should be appreciated that according to one aspect of this embodiment, one or more computer programs that when executed perform methods of the present invention need not reside on a single computer or processor, but may be distributed in a modular fashion amongst a number of different computers or processors to implement various aspects of the present invention.

Computer-executable instructions may be in many forms, such as program modules, executed by one or more computers or other devices. Generally, program modules include routines, programs, objects, components, data structures, etc. that perform particular tasks or implement particular abstract data types. Typically the functionality of the program modules may be combined or distributed as desired in various embodiments.

Also, data structures may be stored in computer-readable media in any suitable form. For simplicity of illustration, data structures may be shown to have fields that are related through location in the data structure. Such relationships may likewise be achieved by assigning storage for the fields with locations in a computer-readable medium that conveys relationship between the fields. However, any suitable mechanism may be used to establish a relationship between information in fields of a data structure, including through the use of pointers, tags or other mechanisms that establish relationship between data elements.

Various aspects of the present invention may be used alone, in combination, or in a variety of arrangements not specifically discussed in the embodiments described in the foregoing and is therefore not limited in its application to the details and arrangement of components set forth in the foregoing description or illustrated in the drawings. For example, aspects described in one embodiment may be combined in any manner with aspects described in other embodiments.

Also, the invention may be embodied as a method, of which an example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

Use of ordinal terms such as "first," "second," "third," etc., in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

Also, the phraseology and terminology used herein is for the purpose of description and should not be regarded as limiting. The use of "including," "comprising," or "having," "containing," "involving," and variations thereof herein, is meant to encompass the items listed thereafter and equivalents thereof as well as additional items.

What is claimed is:

1. A method of detecting subsurface activity, the method comprising:
   receiving vibrations with a first sensor positioned at a first depth relative to a surface of the earth to generate a first signal;
   receiving vibrations with a second sensor positioned at a second depth relative to the surface of the earth to generate a second signal, the second depth being greater than the first depth;
   detecting an event based on a comparison of features of the first signal and the second signal during corresponding time windows, the features comprising one or more of relative amplitude of the first and second signals, relative frequency content of the first and second signals, relative time of values above respective thresholds in the first and second signals, and relative duration of values of the first and second signals above the respective thresholds; and providing an output to indicate detection of the event, wherein detecting the event further comprises determining that, during the first time window, the first signal has frequency components in the range less than the primary frequency components of the second signal during the first time window by at least a threshold percentage.

2. The method of claim 1, further comprising detecting the event comprises detecting primary frequency components in a range having a lower boundary above about 50 Hz and an upper boundary below about 350 Hz during a first time window of the second signal.

3. The method of claim 2, wherein the first sensor is less than 3 meters below the surface.

4. The method of claim 3, wherein the second sensor is buried greater than 3 meters below the surface.

5. The method of claim 1, wherein detecting an event comprises:
identifying a time window during which a signal energy of the second signal in a frequency range exceeds a threshold;
applying a classifier to the features, the features comprising at least relative amplitude and frequency of the first signal and the second signal during the identified time window.

6. The method of claim 5, wherein:
detecting an event further comprises separating the first signal and the second signal into continuous and transient components; and
applying a classifier comprises applying a first classifier to the transient components of the first signal and the second signal and applying a second classifier to the continuous components of the first signal and the second signal.

7. The method of claim 5, wherein the method further comprises:
detecting a background vibration level for each of the first and second sensors; and
prior to detecting events, offsetting the first and second signals by the respective detected background vibration levels.

8. The method of claim 5, wherein the method further comprises:
smoothing the frequency domain representation by removing components at harmonics of 60 Hz.

9. A system for detecting underground activity, the system comprising:
a first sensor located at a first depth below the surface of the ground, the first sensor having a first output indicative of vibrations at the first depth;
a second sensor located at a second depth below the surface of the ground, the second depth being greater than the first depth, and the second sensor having a second output indicative of vibrations at the second depth; and
a processor configured to detect underground activity by comparing features, the features comprising at least the relative amplitude and frequency of the first output and the second output, wherein detecting the underground activity comprises determining that, during a first time window, the first output has frequency components in a range less than primary frequency components of the second output during the first time window by at least a threshold percentage.

10. The system of claim 9, wherein the first sensor and the second sensor are vertically aligned and separated by a distance of at least two meters.

11. The system of claim 10, wherein:
the first sensor and the second sensor comprise a first sensor pair;
the system further comprises a plurality of like sensor pairs disposed along a boundary, each of the plurality of like sensor pairs having a first and second output and being coupled to the processor; and
the processor is configured to detect underground activity by comparing features comprising relative amplitude and frequency of the first output and the second outputs of each of the plurality of like sensor pairs and relative duration of values above the respective thresholds of the first and second outputs of each of the plurality of like sensor pairs.

12. The system of claim 11, wherein the processor is further configured to identify a location of underground activity along the boundary.

13. The system of claim 12, wherein the boundary is the perimeter of a prison.

14. The system of claim 12, wherein the processor comprises a plurality of processing units, each processing unit coupled to and processing the outputs of a subset of the plurality of like sensors.

15. A non-transitory computer storage medium encoded with computer-executable instructions that, when executed, implement a method of subsurface activity detection, the method comprising:
receiving a signal from each of a plurality of vibration sensors positioned to measure vibrations of the earth, the plurality of vibration sensors comprising at least an upper sensor and lower sensor at a location, and each signal representing a measured vibration measured with a respective vibration sensor of the plurality of vibration sensors;
identifying an interval in which the signal from the lower sensor, or the upper sensor or both the lower sensor and the upper sensor exceeds a threshold;
for the identified interval:
computing indications, the indications comprising at least an indication of amplitude and an indication of frequency content of the signals from the upper sensor and the lower sensor;
comparing the computed indications for the upper sensor to the computed indications for the lower sensor; and
indicating an event based on the comparing indicating that, during the identified interval, the signal from the upper sensor has frequency components in a range less than primary frequency components of the signal from the lower sensor by at least a threshold percentage.

16. The computer storage medium of claim 15, wherein:
the indicating an event comprises selectively indicating an event when a relative frequency and a relative amplitude of the upper and lower sensors are characteristic of a subsurface event.

17. The computer storage medium of claim 16, wherein:
the indicating an event comprises not indicating an event when the relative frequency and amplitude of the upper and lower sensors are characteristic of a surface event.

18. The computer storage medium of claim 16, wherein:
the indicating an event comprises indicating an event when the relative frequency and amplitude of the upper and lower sensors are characteristic of a subsurface event in each of a plurality of intervals correlated in time.

19. The computer storage medium of claim 15, wherein:
- computing the indication of amplitude comprises separating the signals from the upper sensor and the lower sensor into continuous and transient components; and
- comparing the computed indications of amplitude and frequency comprises comparing the computed indications for the continuous components and separately comparing the computed indications for the transient components.

* * * * *